US012598501B2

(12) United States Patent
Hong

(10) Patent No.: US 12,598,501 B2
(45) Date of Patent: Apr. 7, 2026

(54) METHOD FOR TRANSMITTING MEASUREMENT GAP COMBINATION, APPARATUS, AND MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD, Beijing (CN)

( * ) Notice: Subject to any disclaimer, the term of this patent is extended or adjusted under 35 U.S.C. 154(b) by 334 days.

(21) Appl. No.: 18/563,640

(22) PCT Filed: May 24, 2021

(86) PCT No.: PCT/CN2021/095600
§ 371 (c)(1),
(2) Date: Nov. 22, 2023

(87) PCT Pub. No.: WO2022/246613
PCT Pub. Date: Dec. 1, 2022

(65) Prior Publication Data
US 2024/0292253 A1 Aug. 29, 2024

(51) Int. Cl.
*H04W 8/22* (2009.01)
*H04W 24/10* (2009.01)
(Continued)

(52) U.S. Cl.
CPC ............. *H04W 24/10* (2013.01); *H04W 8/22* (2013.01); *H04W 64/003* (2013.01);
(Continued)

(58) Field of Classification Search
CPC ..... H04B 17/0082–3913; H04L 5/0001–0098; H04W 4/02–029;
(Continued)

(56) References Cited

U.S. PATENT DOCUMENTS

2019/0260533 A1 8/2019 Manolakos et al.
2022/0046444 A1* 2/2022 Manolakos ........... H04W 24/08

FOREIGN PATENT DOCUMENTS

CN 105101291 A * 11/2015 ............ H04W 24/10
CN 109788497 A 5/2019
(Continued)

OTHER PUBLICATIONS

3GPP TSG-RAN WG2 Meeting #113-e, Ericsson, R2-2101384 "LPP Layer interaction with lower layers for Positioning Frequency layer and Measurement Gap" (2021).

*Primary Examiner* — Timothy J Weidner
(74) *Attorney, Agent, or Firm* — Volpe Koenig

(57) ABSTRACT

A method for transmitting a measurement gap combination includes: transmitting first indication information to user equipment, where the first indication information is configured to indicate at least two measurement gap combinations, and each measurement gap combination corresponds to one carrier frequency. Then receiving second indication information from the user equipment, where the second indication information is configured to indicate a target measurement gap combination that is being used for location measurement, and the target measurement gap combination belongs to the at least two measurement gap combinations. Finally, forbidding execution of scheduling within a time period corresponding to the target measurement gap combination, and executing scheduling within a time period corresponding to the other measurement gap combination in the at least two measurement gap combinations.

20 Claims, 3 Drawing Sheets

| Network device102 | | User equipment101 |
|---|---|---|

S201, Transmit first indication information to user equipment, where the first indication information is configured to indicate at least two measurement gap combinations, and each measurement gap combination corresponds to one carrier frequency S202, Receive second indication information from the user equipment, where the second indication information is configured to indicate a target measurement gap combination that is being used for location measurement, and the target measurement gap combination belongs to the at least two measurement gap combinations S203, Forbid execution of scheduling within a time period corresponding to the target measurement gap combination, and execute scheduling within a time period corresponding to the other measurement gap combination in the at least two measurement gap combinations

(51) Int. Cl.

| | |
|---|---|
| *H04W 64/00* | (2009.01) |
| *H04W 72/12* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ............ *H04W 72/12* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 8/22–245; H04W 24/02–10; H04W 36/0005–385; H04W 64/003–006; H04W 72/02–569; H04W 84/02–16; H04W 88/02–12; H04W 92/02–04; H04W 92/10
See application file for complete search history.

(56) References Cited

FOREIGN PATENT DOCUMENTS

| | | | |
|---|---|---|---|
| CN | 110049509 | A | 7/2019 |
| CN | 111406417 | A | 7/2020 |
| CN | 111466129 | A | 7/2020 |
| WO | 2020215883 | A1 | 10/2020 |

* cited by examiner

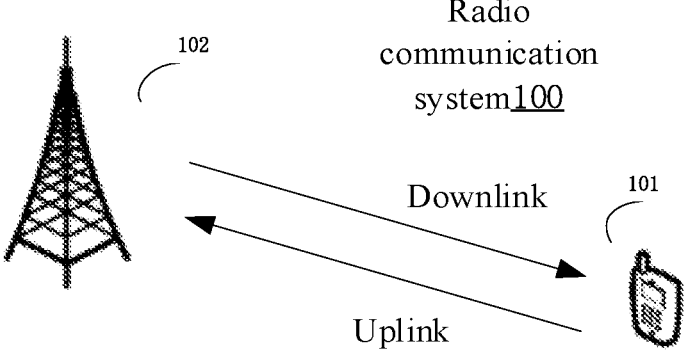

Radio
communication
system 100

102

Downlink

101

Uplink

Fig. 1

| Network device 102 | | User equipment 101 |
|---|---|---|

S201, Transmit first indication information to user equipment, where the first indication information is configured to indicate at least two measurement gap combinations, and each measurement gap combination corresponds to one carrier frequency S202, Receive second indication information from the user equipment, where the second indication information is configured to indicate a target measurement gap combination that is being used for location measurement, and the target measurement gap combination belongs to the at least two measurement gap combinations S203, Forbid execution of scheduling within a time period corresponding to the target measurement gap combination, and execute scheduling within a time period corresponding to the other measurement gap combination in the at least two measurement gap combinations

METHOD FOR TRANSMITTING MEASUREMENT GAP COMBINATION, APPARATUS, AND MEDIUM

CROSS REFERENCE TO RELATED APPLICATION

The present application is a U.S. National Stage of International Application No. PCT/CN2021/095600, filed on May 24, 2021, the contents of all of which are incorporated herein by reference in their entireties for all purposes.

BACKGROUND

In a new radio (NR) positioning system, user equipment (UE) needs to use a measurement gap when instructed by a location server to execute measurement related to location information.

SUMMARY

In view of this, examples of the disclosure provide a method for transmitting a measurement gap combination, an apparatus, and a readable storage medium.

In a first aspect, the example of the disclosure provides a method for transmitting a measurement gap combination. The method is executed by a network device and includes: transmitting first indication information to user equipment, where the first indication information is configured to indicate at least two measurement gap combinations, and each of the at least two measurement gap combinations correspond to one set of carrier frequencies; receiving second indication information from the user equipment, where the second indication information is configured to indicate a target measurement gap combination that is being used for location measurement, and the target measurement gap combination belongs to the at least two measurement gap combinations; and forbidding execution of scheduling within a time period corresponding to the target measurement gap combination, and executing scheduling within a time period corresponding to an other measurement gap combination in the at least two measurement gap combinations.

In a second aspect, the example of the disclosure provides a method for transmitting a measurement gap combination. The method is executed by user equipment and includes: receiving first indication information from a network device, where the first indication information is configured to indicate at least two measurement gap combinations, and each measurement gap combination corresponds to one set of carrier frequencies; and transmitting second indication information to the network device, where the second indication information is configured to indicate a target measurement gap combination that is being used for location measurement, and the target measurement gap combination belongs to the at least two target measurement gap combinations.

In a third aspect, the disclosure provides a communication apparatus including one or more processors and a memory. The memory is configured to store a computer program, and the one or more processors are collectively configured to execute the computer program, so as to implement the first aspect or any possible design in the first aspect.

In a fourth aspect, the disclosure provides a communication apparatus including one or more processors and a memory. The memory is configured to store a computer program, and the one or more processors are collectively configured to execute the computer program, so as to implement the second aspect or any possible design in the second aspect.

In an fifth aspect, the disclosure provides a computer-readable storage medium. The computer-readable storage medium stores an instruction (or referred to as a computer program or a program), where when called and executed by a computer, the instruction causes the computer to execute the first aspect or any possible design in the first aspect.

In a sixth aspect, the disclosure provides a non-transitory computer-readable storage medium. The non-transitory computer-readable storage medium stores an instruction (or referred to as a computer program or a program), where when called and executed by a computer, the instruction causes the computer to execute the second aspect or any possible design in the second aspect.

It should be understood that the above general description and the following detailed description are merely illustrative and explanatory, and cannot limit the disclosure.

BRIEF DESCRIPTION OF THE DRAWINGS

Accompanying drawings described here are used for providing further understanding of examples of the disclosure and constitute part of the disclosure. Schematic examples of the disclosure and their descriptions are used to explain the examples of the disclosure, rather than constitute improper limitation to the disclosure. In the accompanying drawings:

The drawings here are incorporated into the description as a constituent part of the description, illustrate examples conforming to the examples of the disclosure, and serve to explain principles of the example of the disclosure along with the description.

FIG. 1 is a schematic diagram of a transmission system according to an illustrative example.

FIG. 2 is a flowchart of a method for transmitting a measurement gap combination according to an illustrative example.

DETAILED DESCRIPTION

Figure 3:
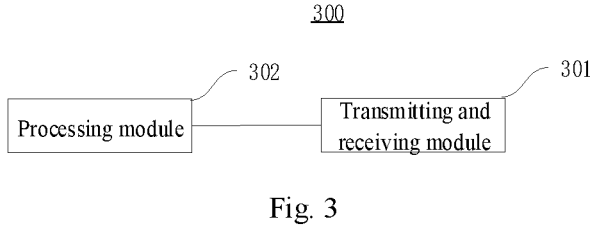
FIG. 3 is a structural diagram of an apparatus for transmitting a measurement gap combination according to an illustrative example.

Examples of the disclosure will be further described below in conjunction with accompanying drawings and specific embodiments.

Illustrative examples will be described in detail here, and their instances are shown in the accompanying drawings. When the following description involves the accompanying drawings, the same numerals in different accompanying drawings indicate the same or similar elements unless otherwise indicated. Embodiments described in the following illustrative examples do not represent all embodiments consistent with the examples of the disclosure. On the contrary, these embodiments are merely instances of apparatuses and methods consistent with some aspects of the disclosure as detailed in the appended claims.

During location measurement, one set of measurement gap configuration information can be exclusively used for measuring a positioning reference signal (PRS) on one carrier since configuration information of PRSs corresponding to different carriers varies. As a result, a network device needs to reconfigure another set of corresponding measurement gap configuration information for the UE if the UE needs to measure a PRS on another carrier. The transmission efficiency is likely to be reduced since such a reconfiguration process is time-consuming.

To this end, it is necessary to study a new solution for solving the problem of transmission efficiency reduction caused by the reconfiguration process.

The disclosure relates to the technical field of radio communication, in particular to a method for transmitting a measurement gap combination, an apparatus, and a readable storage medium.

As shown in FIG. 1, the method for transmitting a measurement gap combination according to the example of the disclosure may be applied to a radio communication system 100. The radio communication system 100 may include user equipment 101 and a network device 102. The user equipment 101 is configured to support carrier aggregation, and the user equipment 101 may be connected to a plurality of carrier units of the network device 102 including a main carrier unit and one or more auxiliary carrier units.

It should be understood that the radio communication system 100 may be applied to a low-frequency scenario and a high-frequency scenario. The application scenarios of the radio communication system 100 include, but are not limited to, a long term evolution (LTE) system, an LTE frequency division duplex (FDD) system, an LTE time division duplex (TDD) system, a worldwide interoperability for micro wave access (WiMAX) communication system, a cloud radio access network (CRAN) system, a future 5th-Generation (5G) system, a new radio (NR) communication system, a future evolved public land mobile network (PLMN) system, etc.

The user equipment 101 (UE) may be a terminal, an access terminal, a terminal unit, a terminal station, a mobile station (MS), a remote station, a remote terminal, a mobile terminal, a radio communication device, a terminal agent or a user device. The user equipment 101 may have a radio transmitting and receiving function, and may communicate with one or more network devices of one or more communication systems (such as radio communication) and receive network services provided by the network devices. The network devices here include, but not limited to, the network device 102 shown in the figure.

The user equipment 101 may be a cellular phone, a cordless phone, a session initiation protocol (SIP) phone, a wireless local loop (WLL) station, a personal digital assistant (PDA) device, a handheld device with a radio communication function, a computation device or other processing devices connected to a radio modem, a vehicle-mounted device, a wearable device, user equipment in a future 5G network or user equipment in a future evolved PLMN network, etc.

The network device 102 may be an access network device (or referred to as an access network site). The access network device refers to a device that provides a network access function, such as a radio access network (RAN) base station. The network device 102 may specifically include a base station (BS), or a base station and a radio resource management device for controlling the base station. The network device 102 may also include a relay station (relay device), an access point, a base station in the future 5G network, a base station in the future evolved PLMN network, or a NR base station. The network device 102 may be a wearable device or a vehicle-mounted device. The network device 102 may also be a communication chip with a communication module.

For example, the network device 102 includes, but is not limited to, gnodeB (gNB) in 5G, an evolved node B in the LTE system, a radio network controller (RNC), node B (NB) in a wideband code division multiple access (WCDMA) system, a radio controller in a centralized radio access network (CRAN) system, a base station controller (BSC), a base transceiver station (BTS) in a global system for mobile communications (GSM) or a code division multiple access (CDMA) system, a home base station (for example, home evolved nodeB, or home node B (HNB)), a baseband unit (BBU), a transmitting and receiving point (TRP), a transmitting point (TP), a mobile switching center, etc.

The example of the disclosure provides a method for transmitting a measurement gap combination. The method is executed by a network device. With reference to FIG. 2, FIG. 2 is a flowchart of a method for transmitting a measurement gap combination according to an illustrative example. As shown in FIG. 2, the method includes steps S201-S203.

In S201, first indication information is transmitted to user equipment. Where the first indication information is configured to indicate at least two measurement gap combinations, and each measurement gap combination corresponds to one set of carrier frequencies.

In S202, second indication information is received from the user equipment. Where the second indication information is configured to indicate a target measurement gap combination that is being used for location measurement, and the target measurement gap combination belongs to the at least two measurement gap combinations.

In S203, execution of scheduling is forbidden within a time period corresponding to the target measurement gap combination, and scheduling is executed within a different time period corresponding to the other measurement gap combination in the at least two measurement gap combinations.

In some possible embodiments, each measurement gap combination at least includes: a period, duration and a time offset.

In some possible embodiments, a number of the at least two measurement gap combinations is 2. In some possible embodiments, a number of the at least two measurement gap combinations is 3. In some possible embodiments, a number of the at least two measurement gap combinations is 4 or higher than 4.

In the example of the disclosure, a plurality of measurement gap combinations are set by the network device, and each measurement gap combination corresponds to one set of carrier frequencies. The user equipment actively reports the target measurement gap combination that is being used for location measurement to the network device. Additionally, the network device can be informed of a measurement gap combination that is being used for location measurement and a measurement gap combination that is not being used for location measurement accordingly. Thus, the network device may perform no scheduling within a time period corresponding to a measurement gap combination that is being used for location measurement, and perform normal scheduling within a time period corresponding to a measurement gap combination that is not being used for location measurement. In this way, the condition that the network device needs to reconfigure the measurement gap frequently through radio resource control (RRC) when the user equipment frequently switches a carrier frequency for measurement since the network device configures one measurement gap combination for the user equipment is avoided, and data transmission efficiency can be improved.

In some possible embodiments, after the second indication information is received from the user equipment, it is determined that the target measurement gap combination that is being used for location measurement is in an active state, and the other measurement gap combination in the at least two measurement gap combinations are in an inactive state. Based on that, no scheduling is executed within the time period corresponding to the target measurement gap combination, and scheduling is executed within the time period corresponding to the other measurement gap combination in the at least two measurement gap combinations.

In the example of the disclosure, the second indication information is obtained from the user equipment, such that knowledge that the user equipment starts to execute location measurement is obtained, knowledge that the measurement gap combinations are in an active state or inactive state is also obtained. Based on that, knowledge of the location measurement of the user equipment can be obtained, and normal scheduling can still be performed within the time period corresponding to the measurement gap combination in the inactive state. Thus, data transmission efficiency is improved.

The example of the disclosure provides a method for transmitting a measurement gap combination. The method is executed by a network device. The method includes the following.

First indication information is transmitted to user equipment. Where the first indication information is configured to indicate at least two measurement gap combinations, and is further configured to indicate a carrier frequency corresponding to each measurement gap combination, and each measurement gap combination corresponds to one set of carrier frequencies.

Second indication information is received from the user equipment. Where the second indication information is configured to indicate a target measurement gap combination that is being used for location measurement, and the target measurement gap combination belongs to the at least two measurement gap combinations.

Finally, execution of scheduling is forbidden within a time period corresponding to the target measurement gap combination, and scheduling is executed within a time period corresponding to the other measurement gap combination in the at least two measurement gap combinations.

In the example of the disclosure, the first indication information is further configured to indicate a carrier frequency corresponding to each measurement gap combination. Thus, the user equipment can be informed of the carrier frequency corresponding to each measurement gap combination. Based on that, when one measurement gap combination is set for location measurement, location measurement is performed on carrier frequencies corresponding to the measurement gap combination.

The example of the disclosure provides a method for transmitting a measurement gap combination. The method is executed by a network device. The method includes the following.

Positioning reference signal configuration information of a cell to be measured is received from the user equipment.

The at least two measurement gap combinations are set according to the positioning reference signal configuration information.

First indication information is transmitted to user equipment. Where the first indication information is configured to indicate at least two measurement gap combinations, and each measurement gap combination corresponds to one set of carrier frequencies.

Second indication information is received from the user equipment. Where the second indication information is configured to indicate a target measurement gap combination that is being used for location measurement, and the target measurement gap combination belongs to the at least two measurement gap combinations.

Finally, execution of scheduling is forbidden within a time period corresponding to the target measurement gap combination, and scheduling is executed within a time period corresponding to the other measurement gap combination in the at least two measurement gap combinations.

In some possible embodiments, the positioning reference signal configuration information of the cell to be measured includes a corresponding relation among a carrier frequency, a period and a time offset.

In some possible embodiments, the step that positioning reference signal configuration information of a cell to be measured is received from the user equipment includes: a LocationMeasurementInfo message is received from the user equipment. The LocationMeasurementInfo message includes the positioning reference signal configuration information of the cell to be measured. The positioning reference signal configuration information of the cell to be measured is configured to help the network device to set the measurement gap combination.

In the example of the disclosure, since each cell to be measured corresponds to a plurality of positioning reference signal configuration information, offsets, periods or duration of and different positioning reference signal configuration information vary, different measurement gap combinations are configured and correspond to different carrier frequency groups.

The example of the disclosure provides a method for transmitting a measurement gap combination. The method is executed by a network device. The method includes the following.

Positioning reference signal configuration information of a cell to be measured is received from the user equipment.

A corresponding relation among a carrier frequency, a period, and a time offset that are included in the positioning reference signal configuration information is determined. Carrier frequencies satisfying at least one of conditions are divided into the same carrier frequency group, and it is determined that the same carrier frequency group corresponds to the same measurement gap combination, where the conditions are as follows: periods corresponding to at least two carrier frequencies are the same or in a multiple relation, and time offsets corresponding to at least two carrier frequencies are the same or differ by a set number of time slots.

First indication information is transmitted to user equipment. Where the first indication information is configured to indicate at least two measurement gap combinations, and each measurement gap combination corresponds to one set of carrier frequencies.

Second indication information is received from the user equipment. Where the second indication information is configured to indicate a target measurement gap combination that is being used for location measurement, and the target measurement gap combination belongs to the at least two measurement gap combinations.

Finally, execution of scheduling is forbidden within a time period corresponding to the target measurement gap combination, and scheduling is executed within a time period corresponding to the other measurement gap combination in the at least two measurement gap combinations.

In the example of the disclosure, carrier frequencies that may be measured by using the same measurement gap combination are divided into the same carrier frequency group. Thus, the user equipment performs location measurement on carrier frequencies in the same carrier frequency group by using the same measurement gap combinations, and measurement efficiency of the user equipment is improved.

The example of the disclosure provides a method for transmitting a measurement gap combination. The method is executed by a network device. The method includes the following.

Radio resource control signaling is transmitted to the user equipment, where a Measurement Configuration (MeasConfig) message in the radio resource control signaling includes the first indication information. The first indication information is configured to indicate at least two measurement gap combinations, and each measurement gap combination corresponds to one set of carrier frequencies.

Second indication information is received from the user equipment. Where the second indication information is configured to indicate a target measurement gap combination that is being used for location measurement, and the target measurement gap combination belongs to the at least two measurement gap combinations.

Finally, execution of scheduling is forbidden within a time period corresponding to the target measurement gap combination, and scheduling is executed within a time period corresponding to the other measurement gap combination in the at least two measurement gap combinations.

The example of the disclosure provides a method for transmitting a measurement gap combination. The method is executed by a network device. The method includes the following.

First indication information is transmitted to user equipment. Where the first indication information is configured to indicate at least two measurement gap combinations, and each measurement gap combination corresponds to one set of carrier frequencies.

Second indication information is received from the user equipment. Where the second indication information is configured to indicate a target measurement gap combination that is being used for location measurement, and the target measurement gap combination belongs to the at least two measurement gap combinations.

Execution of scheduling is forbidden within a time period corresponding to the target measurement gap combination, and scheduling is executed within a time period corresponding to the other measurement gap combination in the at least two measurement gap combinations.

A measurement result is received from the user equipment.

In some possible embodiments, at least one of measurement results of reference signal time difference (RSTD) and downlink-positioning reference signal-reference signal receiving power (DL-PRS-RSRP) is received for downlink-time difference of arrival (DL-TDOA), and a measurement result of DL-PRS-RSRP and a DL-PRS receiving beam indication are received for a downlink angle of departure (DL-AoD).

The example of the disclosure provides a method for transmitting a measurement gap combination. The method is executed by a network device. The method includes the following.

First indication information is transmitted to user equipment. Where the first indication information is configured to indicate at least two measurement gap combinations, and each measurement gap combination corresponds to one set of carrier frequencies.

Second indication information is received from the user equipment. Where the second indication information is configured to indicate a target measurement gap combination that is being used for location measurement, and the target measurement gap combination belongs to the at least two measurement gap combinations.

Execution of scheduling is forbidden within a time period corresponding to the target measurement gap combination, and scheduling is executed within a time period corresponding to the other measurement gap combination in the at least two measurement gap combinations.

Third indication information is received from the user equipment. Where the third indication information is configured to indicate completion of measurement that uses the target measurement gap combination.

In some possible embodiments, after the third indication information is received from the user equipment and be informed of indicated completion of measurement that uses the target measurement gap combination, it is determined that all measurement gap combinations are in an inactive state.

In the example of the disclosure, after receiving the third indication information from the user equipment, the network device determines that all measurement gap combinations are in an inactive state. In this way, the network device can be clearly informed of time when a user completes location measurement. Thus, normal service scheduling can be performed within any time period.

The example of the disclosure provides a method for transmitting a measurement gap combination. The network is executed by a network device. The method includes the following.

First indication information is transmitted to user equipment. Where the first indication information is configured to indicate at least two measurement gap combinations, and each measurement gap combination corresponds to one set of carrier frequencies.

Second indication information is received from the user equipment. Where the second indication information is configured to indicate a target measurement gap combination that is being used for location measurement, and the target measurement gap combination belongs to the at least two measurement gap combinations.

Execution of scheduling is forbidden within a time period corresponding to the target measurement gap combination, and scheduling is executed within a time period corresponding to the other measurement gap combination in the at least two measurement gap combinations.

Uplink control information is received from the user equipment. Where the uplink control information includes the third indication information, and the third indication information is configured to indicate completion of measurement that uses the target measurement gap combination.

Scheduling is executed within a time period corresponding to the at least two measurement gap combinations.

In the example of the disclosure, after receiving the third indication information from the user equipment, the network device determines that all measurement gap combinations are in an inactive state. In this way, the network device can be clearly informed of time when a user completes location measurement. Thus, normal service scheduling can be performed within any time period.

The example of the disclosure provides a method for transmitting a measurement gap combination. The method is executed by user equipment. The method includes the following.

First indication information is received from a network device. Where the first indication information is configured to indicate at least two measurement gap combinations, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

In the example of the disclosure, a plurality of measurement gap combinations are set by the network device, and each measurement gap combination corresponds to one set of carrier frequencies. The user equipment actively reports the target measurement gap combination that is being used for location measurement to the network device. The network device can be informed of a measurement gap combination that is being used for location measurement and a measurement gap combination that is not being used for location measurement accordingly. Thus, the network device may perform no scheduling within a time period corresponding to a measurement gap combination that is being used for location measurement, and perform normal scheduling within a time period corresponding to a measurement gap combination that is not being used for location measurement. In this way, the condition that the network device needs to reconfigure the measurement gap frequently through radio resource control (RRC) when the user equipment frequently switches a carrier frequency for measurement since the network device configures one measurement gap combination for the user equipment is avoided, and data transmission efficiency is improved.

The example of the disclosure provides a method for transmitting a measurement gap combination. The method is executed by user equipment. The method includes the following.

Radio resource control signaling is received from a network device. Where a MeasConfig message in the radio resource control signaling includes first indication information, the first indication information is configured to indicate at least two measurement gap combinations, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

The example of the disclosure provides a method for transmitting a measurement gap combination. The method is executed by user equipment. The method includes the following.

First indication information is received from a network device. Where the first indication information is configured to indicate at least two measurement gap combinations, and is further configured to indicate a carrier frequency corresponding to each measurement gap combination, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

The example of the disclosure provides a method for transmitting a measurement gap combination. The method is executed by user equipment. The method includes the following.

Positioning reference signal configuration information of a cell to be measured is transmitted to the network device, and the network device is caused to set the at least two measurement gap combinations according to the positioning reference signal configuration information.

First indication information is received from a network device. Where the first indication information is configured to indicate at least two measurement gap combinations, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

The example of the disclosure provides a method for transmitting a measurement gap combination. The method is executed by user equipment. The method includes the following.

Auxiliary information is received from a location server. Where the auxiliary information is configured to cause the user equipment to obtain a reference cell configuration list, reference cell configuration information and carrier configuration information for location measurement.

Positioning reference signal configuration information of a cell to be measured is transmitted to the network device. The network device is caused to set the at least two measurement gap combinations according to the positioning reference signal configuration information.

First indication information is received from a network device. Where the first indication information is configured to indicate at least two measurement gap combinations, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

The example of the disclosure provides a method for transmitting a measurement gap combination. The method is executed by user equipment. The method includes the following.

First indication information is received from a network device. Where the first indication information is configured to indicate at least two measurement gap combinations, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

Location measurement is performed on carrier frequencies corresponding to the target measurement gap combination by using the target measurement gap combination, and a measurement result is obtained.

The measurement result is transmitted to a location server.

In some possible embodiments, at least one of measurement results of reference signal time difference (RSTD) and downlink-positioning reference signal-reference signal receiving power (DL-PRS-RSRP) is received for downlink-time difference of arrival (DL-TDOA), and a measurement result of DL-PRS-RSRP and a DL-PRS receiving beam indication are received for a downlink angle of departure (DL-AoD).

The example of the disclosure provides a method for transmitting a measurement gap combination. The method is executed by user equipment. The method includes the following.

First indication information is received from a network device. Where the first indication information is configured to indicate at least two measurement gap combinations, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

Location measurement that uses the target measurement gap combination is completed, and third indication information is transmitted to the network device. Where the third indication information is configured to indicate completion of measurement that uses the target measurement gap combination.

In some possible embodiments, after receiving the third indication information, a base station determines that all measurement gap combinations are in an inactive state.

The example of the disclosure provides a method for transmitting a measurement gap combination. The method is executed by user equipment. The method includes the following.

First indication information is received from a network device. Where the first indication information is configured to indicate at least two measurement gap combinations, and each measurement gap combination corresponds to one set of carrier frequencies.

Second indication information is transmitted to the network device. Where the second indication information is configured to indicate a target measurement gap combination that is being used for location measurement, and the target measurement gap combination belongs to the at least two target measurement gap combinations.

Location measurement that uses the target measurement gap combination is completed, and uplink control information is transmitted to the network device. Where the uplink control information includes the third indication information, and the third indication information is configured to indicate completion of measurement that uses the target measurement gap combination.

In some possible embodiments, after receiving the third indication information, a base station determines that all measurement gap combinations are in an inactive state.

Detailed description will be made below with reference to specific examples.

Specific Example

Step 1, a location server transmits auxiliary information to user equipment. Where the auxiliary information is configured to cause the user equipment to obtain a reference cell configuration list, reference cell configuration information, and carrier configuration information for location measurement.

Step 2, the user equipment transmits positioning reference signal configuration information of a cell to be measured through a LocationMeasurementInfo message.

Step 3, the network device receives the positioning reference signal configuration information of the cell to be measured from the user equipment, and the positioning reference signal configuration information includes: a carrier frequency f1 for a period of 40 ms; a carrier frequency f2 for a period of 80 ms; a carrier frequency f3 for a period of 30 ms; and a carrier frequency f4 for a period of 60 ms.

Step 4, the network device determines two measurement gap combinations according to the positioning reference signal configuration information of the cell to be measured received from the user equipment.

In view of a multiple relation between a period corresponding to the carrier frequency f1 and a period corresponding to the carrier frequency f2, the carrier frequency f1 and the carrier frequency f2 are constructed as a first carrier frequency group.

In view of a multiple relation between a period corresponding to the carrier frequency f3 and a period corresponding to the carrier frequency f4, the carrier frequency f3 and the carrier frequency f4 are constructed as a second carrier frequency group.

The first carrier frequency group corresponds to a first measurement gap combination. The second carrier frequency group corresponds to a second measurement gap combination.

Step 5, the network device transmits first indication information to the user equipment. Where the first indication information is configured to indicate the first measurement gap combination and the second measurement gap combination. Further, the first indication information is configured to indicate the first carrier frequency group corresponding to the first measurement gap combination and the second carrier frequency group corresponding to the second measurement gap combination.

Step 6, the user equipment executes location measurement on the carrier frequency f1 and the carrier frequency f2 by using the first measurement gap combination, and the user equipment transmits second indication information to the network device to indicate the first measurement gap combination that is being used for location measurement.

Step 7, after receiving the second indication information, the network device determines that the first measurement gap combination is in an active state and the second measurement gap combination is in an inactive state, no scheduling is executed within a time period corresponding to the first measurement gap combination, and scheduling is executed within a time period corresponding to the second measurement gap combination.

Step 8, after executing location measurement on the carrier frequency f1 and the carrier frequency f2 by using the first measurement gap combination, the user equipment transmits third indication information to the network device, and the third indication information is configured to indicate completion of measurement that uses the first measurement gap combination.

Step 9: after receiving the third indication information, the network device determines that the first measurement gap combination and the second measurement gap combination are in an inactive state, and normal scheduling may be executed at any time period.

Based on the same concept as the method examples, the example of the disclosure further provides a communication apparatus. The communication apparatus may have the functions of the network device 102 in the method example, and may be configured to execute steps that are provided by the method example and executed by the network device 102. The function may be implemented by hardware, or by software or by executing corresponding software through hardware. The hardware or software includes one or more modules corresponding to the above functions.

In one possible embodiment, the communication apparatus 300 shown in FIG. 3 may be used as a network device involved in the method example, and can execute steps executed by the network device in the method example. As shown in FIG. 3, the communication apparatus 300 may include a transmitting and receiving module 301 and a processing module 302. The transmitting and receiving module 301 and the processing module 302 are at least communicatively coupled with each other. The transmitting and receiving module 301 may be configured to support communication of the communication apparatus 300. The transmitting and receiving module 301 may have a radio communication function, for example, the transmitting and receiving module 301 may perform radio communication with other communication apparatuses through radio. The processing module 302 may be configured to support the communication apparatus 300 to execute a processing action in the method examples, including but not limited to actions that information and messages that are transmitted by the transmitting and receiving module 301 is generated, and/or a signal that is received by the transmitting and receiving module 301 is demodulated and decoded. The processing module 302 may be processor of any kind.

When steps that are performed by the network device 102 are executed, the transmitting and receiving module 301 is configured to transmit first indication information to the user equipment. Where the first indication information is configured to indicate at least two measurement gap combinations, and each measurement gap combination corresponds to one set of carrier frequencies. Further, the transmitting and receiving module 301 is configured to receive second indication information from the user equipment. Where the second indication information is configured to indicate a target measurement gap combination that is being used for location measurement, and the target measurement gap combination belongs to the at least two measurement gap combinations.

The processing module 302 is configured to forbid execution of scheduling within a time period corresponding to the target measurement gap combination, and execute scheduling within a time period corresponding to the other measurement gap combination in the at least two measurement gap combinations.

In some possible embodiments, the first indication information is further configured to indicate a carrier frequency corresponding to each measurement gap combination.

In some possible embodiments, the transmitting and receiving module 301 is further configured to receive positioning reference signal configuration information of a cell to be measured from the user equipment.

The processing module 302 is further configured to set the at least two measurement gap combinations according to the positioning reference signal configuration information.

In some possible embodiments, the processing module 302 is further configured to set the at least two measurement gap combinations according to the positioning reference signal configuration information by the following method.

A corresponding relation among a carrier frequency, a period and a time offset that are included in the positioning reference signal configuration information is determined, carrier frequencies satisfying at least one of conditions are divided into the same carrier frequency group, and it is determined that the same carrier frequency group corresponds to the same measurement gap combination, where the conditions are as follows: periods corresponding to at least two carrier frequencies are the same or in a multiple relation, and time offsets corresponding to at least two carrier frequencies are the same or differ by a set number of time slots.

In some possible embodiments, the transmitting and receiving module 301 is further configured to transmit first indication information to user equipment by the following method: radio resource control signaling is transmitted to the user equipment, where a MeasConfig message in the radio resource control signaling includes the first indication information.

In some possible embodiments, the transmitting and receiving module 301 is further configured to receive third indication information from the user equipment. Where the third indication information is configured to indicate completion of measurement that uses the target measurement gap combination.

In some possible embodiments, the transmitting and receiving module 301 is further configured to receive third indication information from the user equipment by the following method: uplink control information is received from the user equipment, where the uplink control information includes the third indication information.

Figure 4:
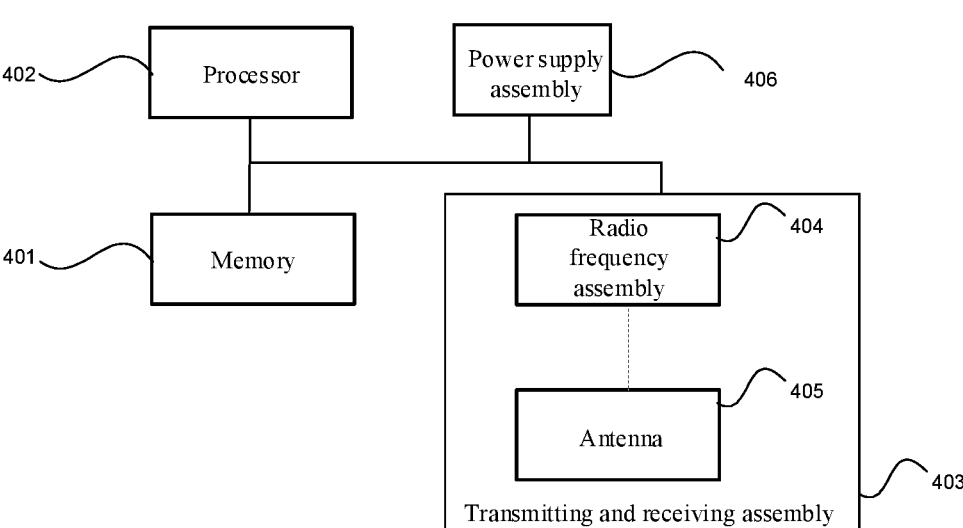
FIG. 4 is a structural diagram of another apparatus for transmitting a measurement gap combination according to an illustrative example.

When the communication apparatus is a network device 102, a structure may also be as shown in FIG. 4. The structure of the communication apparatus is described with a base station as an example. As shown in FIG. 4, an apparatus 400 includes a memory 401, a processor 402, a transmitting and receiving assembly 403, and a power supply assembly 406 communicatively coupled to one another.

The memory 401 is at least communicatively coupled with the processor 402 and may be configured to store programs and data for the communication apparatus 400 to implement various functions. The processor 402 is configured to support the communication apparatus 400 to execute corresponding functions in the methods, and the function(s) may be implemented by calling the program stored in the memory 401.

The transmitting and receiving assembly 403 may be a radio transceiver, and may be configured to support the communication apparatus 400 to receive signaling and/or data and transmit signaling and/or data through a radio. The transmitting and receiving module 403 may also be referred to as a transmitting and receiving unit or a communication unit. The transmitting and receiving assembly 403 may include a radio frequency assembly 404 and one or more antennas 405. The radio frequency module 404 may be a remote radio unit (RRU), and may be configured to transmit radio frequency signals and convert the radio frequency signals to baseband signals. The one or more antennas 405 may be specifically configured to transmit and receive radio frequency signals.

The power supply assembly 406 energizes various assemblies of the apparatus 400. The power supply assembly 406 may include a power supply management system, one or more power supplies, and other assemblies associated with power generation, management, and distribution for the apparatus 400.

When the communication apparatus 400 needs to transmit data, the processor 402 may perform baseband processing on the data to be transmitted, and then output a baseband signal to the radio unit. The radio unit performs radio frequency processing on the baseband signal and then transmits the radio frequency signal in the form of electromagnetic waves through an antenna. When data are transmitted to the communication apparatus 400, the radio unit receives the radio frequency signal through the antenna, converts the radio frequency signal into the baseband signal, and outputs the baseband signal to the processor 402. The processor 402 converts the baseband signal into data and processes the data.

Based on the same concept as the method examples, the example of the disclosure further provides a communication apparatus. The communication apparatus may have the functions of the user equipment 101 in the method examples, and may be configured to execute steps that are provided by the method examples and executed by the user equipment 101. The functions may be implemented by hardware, or by software or by executing corresponding software through hardware. The hardware or software includes one or more modules corresponding to the functions included herein.

Figure 5:
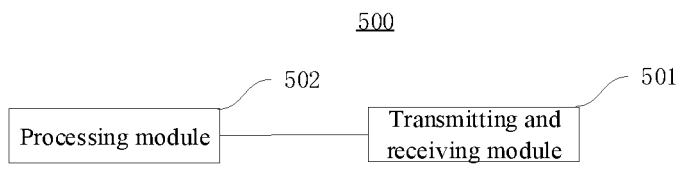
FIG. 5 is a structural diagram of yet another apparatus for transmitting a measurement gap combination according to an illustrative example.

In one possible embodiment, the communication apparatus 500 shown in FIG. 5 may be used as the user equipment involved in the method examples, and execute steps execute by the user equipment in the method examples. As shown in FIG. 5, the communication apparatus 500 may include a transmitting and receiving module 501 and a processing module 502. The transmitting and receiving module 501 and the processing module 502 are at least communicatively coupled with each other. The processing module 502 may be processor of any kind.

The transmitting and receiving module 501 may be configured to support communication of the communication apparatus 500. Additionally, the transmitting and receiving module 501 may have a radio communication function, for example, perform radio communication with other communication apparatuses through radio. The processing module 502 may be configured to support the communication apparatus 500 to execute a processing action in the method examples, including but not limited to: information and messages that are transmitted by the transmitting and receiving module 501 is generated, and/or a signal that is received by the transmitting and receiving module 501 is demodulated and decoded.

When steps that are implemented by the user equipment 101 are executed, the transmitting and receiving module 501 is configured to receive first indication information from a network device. Where the first indication information is configured to indicate at least two measurement gap combinations, and each measurement gap combination corresponds to one set of carrier frequencies. The transmitting and receiving module 501 is further configured to transmit second indication information to the network device, where the second indication information is configured to indicate a target measurement gap combination that is being used for location measurement, and the target measurement gap combination belongs to the at least two target measurement gap combinations.

The transmitting and receiving module 501 is further configured to receive radio resource control signaling from the network device, where a MeasConfig message in the radio resource control signaling includes the first indication information.

In some possible embodiments, the first indication information is further configured to indicate a carrier frequency corresponding to each measurement gap combination.

In some possible embodiments, the processing module 502 is configured to perform location measurement on carrier frequencies corresponding to the target measurement gap combination by using the target measurement gap combination, and obtain a measurement result. The transmitting and receiving module 502 is further configured to transmit the measurement result to a location server.

In some possible embodiments, the processing module 501 is further configured to complete location measurement that uses the target measurement gap combination, and then transmit third indication information to the network device. Where the third indication information is configured to indicate completion of measurement that uses the target measurement gap combination.

In some possible embodiments, the transmitting and receiving module 501 is further configured to transmit third indication information to the network device by the following method: uplink control information is transmitted to the network device. Where the uplink control information includes the third indication information.

Figure 6:
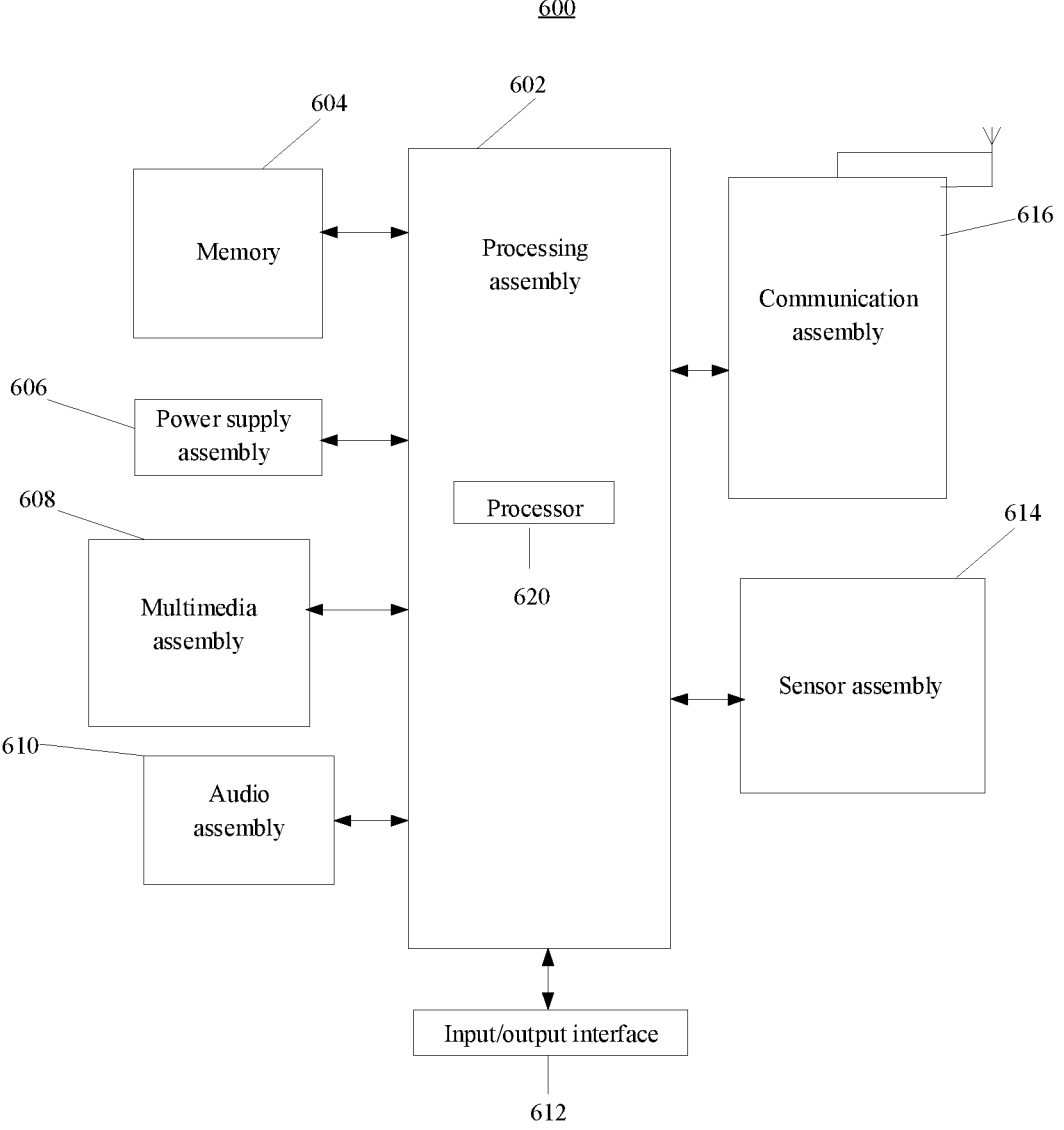
FIG. 6 is a structural diagram of still another apparatus for transmitting a measurement gap combination according to an illustrative example.

When the communication apparatus is user equipment 101, a structure may also be as shown in FIG. 6. The apparatus 600 of FIG. 6 may be a mobile phone, a computer, a digital broadcast terminal, a message transmitting and receiving device, a game console, a tablet device, a medical device, a fitness device, a personal digital assistant, etc.

With reference to FIG. 6, the apparatus 600 may include one or more of a processing assembly 602, a memory 604, a power supply assembly 606, a multimedia assembly 608, an audio assembly 610, an input/output (I/O) interface 612, a sensor assembly 614, and a communication assembly 616, that are at least communicative coupled to one another.

The processing assembly 602 controls an overall operation of the apparatus 600, such as an operation associated with display, a telephone call, data communication, a camera operation, and a recording operation. The processing assembly 602 may include one or more processors 620 for executing an instruction, and completing all or some of the steps of the included methods. In addition, the processing assembly 602 may include one or more modules to facilitate interaction between the processing assembly 602 and other assemblies. For example, the processing assembly 602 may include a multimedia module to facilitate interaction between the multimedia assembly 608 and the processing assembly 602.

The memory 604 is configured to store various types of data to support the operation of the apparatus 600. Instances of such data include instructions for any application or method operated on the apparatus 600, contact data, phonebook data, messages, pictures, videos, etc. The memory 604 may be implemented by any type of volatile or non-volatile storage devices or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 606 energizes various assemblies of the apparatus 600. The power supply assembly 606 may include a power supply management system, one or more power supplies, and other assemblies associated with power generation, management, and distribution for the apparatus 600.

The multimedia assembly 608 includes a screen providing an output interface between the apparatus 600 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, swipe, and gestures on the touch panel. The touch sensors may not merely sense a boundary of a touch or swipe action, but also measure time of duration and a pressure associated with the touch or swipe action. In some examples, the multimedia assembly 608 includes a front-facing camera and/or a rear-facing camera. When the apparatus 600 is in an operational mode, for example, a photographing mode or a video mode, the front-facing camera and/or the rear-facing camera may receive external multimedia data. Each of the front-facing camera and the rear-facing camera may be a constant optical lens system or have a variable focal length and optical zoom capacity.

The audio assembly 610 is configured to output and/or input an audio signal. For example, the audio assembly 610 includes a microphone (MIC). The microphone is configured to receive an external audio signal when the apparatus 600 is in an operation mode such as a call mode, a recording mode or a speech recognition mode. The received audio signal may be further stored in the memory 604 or transmitted via the communication assembly 616. In some examples, the audio assembly 610 further includes a speaker for outputting audio signals.

The I/O interface 612 provides an interface between the processing assembly 602 and a peripheral interface module. The peripheral interface module may be keyboards, click wheels, buttons, etc. These buttons may include, but are not limited to: a home button, a volume button, a start button, and a lock button.

The sensor assembly 614 includes one or more sensors for providing state evaluation in various aspects for the apparatus 600. For example, the sensor assembly 614 may detect an on/off state of the apparatus 600, and relative location of assemblies, for example, the assemblies are a display and a keypad of the apparatus 600. The sensor assembly 614 may also detect a change in location of the apparatus 600 or an assembly of the apparatus 600, presence or absence of contact between the user and the apparatus 600, an orientation or acceleration/deceleration of the apparatus 600, and a change in temperature of the apparatus 600. The sensor assembly 614 may include a proximity sensor configured to detect presence of a nearby object without any physical contact. The sensor assembly 614 may further include an optical sensor, such as a complementary metal-oxide-semiconductor transistor (CMOS) or charge-coupled device (CCD) image sensor, for use in imaging applications. In some examples, the sensor assembly 614 may further include an acceleration sensor, a gyroscope sensor, a magnetic sensor, a pressure sensor, or a temperature sensor.

The communication assembly 616 is configured to facilitate wired or wireless communication between the apparatus 600 and other devices. The apparatus 600 may access a wireless network based on a communication standard, such as WiFi, the 2nd generation mobile communication technology (2G) or the 3rd generation mobile communication technology (3G), or their combinations. In an illustrative example, the communication assembly 616 receives a broadcast signal or related broadcast information from an external broadcast management system via a broadcast channel. In an illustrative example, the communication assembly 616 further includes a near field communication (NFC) module to promote short-range communication. For example, the NFC module may be implemented based on a radio frequency identification (RFID) technology, an infrared data association (IrDA) technology, an ultra-wide band (UWB) technology, a Bluetooth (BT) technology, etc.

In an illustrative example, the apparatus 600 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for executing the method.

In an illustrative example, a non-transitory computer-readable storage medium including an instruction is further provided, such as the memory 604 including an instruction. The instruction may be executed by the processor 620 of the apparatus 600 for implementing the method. For example, the non-transitory computer-readable storage medium may be a read only memory (ROM), a random access memory (RAM), a CD-ROM, a magnetic tape, a floppy disc, an optical data storage device, etc.

INDUSTRIAL APPLICABILITY

A plurality of measurement gap combinations are set by the network device, and each measurement gap combination corresponds to one set of carrier frequencies. The user equipment actively reports the target measurement gap combination that is being used for location measurement to the network device, the network device can be informed of a measurement gap combination that is being used for location measurement and a measurement gap combination that is not being used for location measurement accordingly. Thus, the network device may perform no scheduling within a time period corresponding to a measurement gap combination that is being used for location measurement, and perform normal scheduling within a time period corresponding to a measurement gap combination that is not being used for location measurement. In this way, the condition that the network device configures one measurement gap combination for the user equipment, the network device needs to reconfigure the measurement gap frequently through radio resource control (RRC) when the user equipment frequently switches a carrier frequency for measurement is avoided, and data transmission efficiency is improved.

In view of this, examples of the disclosure provide a method for transmitting a measurement gap combination, an apparatus, and a readable storage medium.

In a first aspect, the example of the disclosure provides a method for transmitting a measurement gap combination. The method is executed by a network device and includes: transmitting first indication information to user equipment, where the first indication information is configured to indicate at least two measurement gap combinations, and each measurement gap combination corresponds to one set of carrier frequencies; receiving second indication information from the user equipment, where the second indication information is configured to indicate a target measurement gap combination that is being used for location measurement, and the target measurement gap combination belongs to the at least two measurement gap combinations; and forbidding execution of scheduling within a time period corresponding to the target measurement gap combination, and executing scheduling within a time period corresponding to the other measurement gap combination in the at least two measurement gap combinations.

By using the method, a plurality of measurement gap combinations are set by the network device, and each measurement gap combination corresponds to one set of carrier frequencies; the user equipment actively reports the target measurement gap combination that is being used for location measurement to the network device, the network device can be informed of a measurement gap combination that is being used for location measurement and a measurement gap combination that is not being used for location measurement accordingly. Thus, the network device may perform no scheduling within a time period corresponding to a measurement gap combination that is being used for location measurement, and perform normal scheduling within a time period corresponding to a measurement gap combination that is not being used for location measurement; and in this way, the condition that the network device needs to reconfigure the measurement gap frequently through radio resource control (RRC) when the user equipment frequently switches a carrier frequency for measurement since the network device merely configures one measurement gap combination for the user equipment is avoided, and data transmission efficiency can be improved.

In an embodiment, the first indication information is further configured to indicate a carrier frequency corresponding to each measurement gap combination.

In an embodiment, the method further includes: receiving positioning reference signal configuration information of a cell to be measured from the user equipment; and setting the at least two measurement gap combinations according to the positioning reference signal configuration information.

In an embodiment, the setting the at least two measurement gap combinations according to the positioning reference signal configuration information includes: determining a corresponding relation among a carrier frequency, a period and a time offset that are included in the positioning reference signal configuration information, dividing carrier frequencies satisfying at least one of conditions into the same carrier frequency group, and determining that the same carrier frequency group corresponds to the same measurement gap combination. Where the conditions are as follows: periods corresponding to at least two carrier frequencies are the same or in a multiple relation; and time offsets corresponding to at least two carrier frequencies are the same or differ by a set number of time slots.

In an embodiment, the transmitting first indication information to user equipment includes: transmitting radio resource control signaling to the user equipment, where a MeasConfig message in the radio resource control signaling includes the first indication information.

In an embodiment, the method further includes: receiving third indication information from the user equipment, where the third indication information is configured to indicate completion of measurement that uses the target measurement gap combination.

In an embodiment, the receiving third indication information from the user equipment includes: receiving uplink control information from the user equipment, where the uplink control information includes the third indication information.

In a second aspect, the example of the disclosure provides a method for transmitting a measurement gap combination. The method is executed by user equipment and includes: receiving first indication information from a network device, where the first indication information is configured to indicate at least two measurement gap combinations, and each measurement gap combination corresponds to one set of carrier frequencies; and transmitting second indication information to the network device. Where the second indication information is configured to indicate a target measurement gap combination that is being used for location measurement, and the target measurement gap combination belongs to the at least two target measurement gap combinations.

In an embodiment, the receiving first indication information from a network device includes: receiving radio resource control signaling from the network device, where a MeasConfig message in the radio resource control signaling includes the first indication information.

In an embodiment, the first indication information is further configured to indicate a carrier frequency corresponding to each measurement gap combination.

In an embodiment, the method further includes: transmitting positioning reference signal configuration information of a cell to be measured to the network device, and causing the network device to set the at least two measurement gap combinations according to the positioning reference signal configuration information.

In an embodiment, the method further includes: receiving auxiliary information from a location server, where the auxiliary information is configured to cause the user equipment to obtain a reference cell configuration list, reference cell configuration information and carrier configuration information for location measurement.

In an embodiment, the method further includes: performing location measurement on carrier frequencies corresponding to the target measurement gap combination by using the target measurement gap combination, and obtaining a measurement result; and transmitting the measurement result to a location server.

In an embodiment, the method further includes: completing location measurement that uses the target measurement gap combination, and transmitting third indication information to the network device, where the third indication information is configured to indicate completion of measurement that uses the target measurement gap combination.

In an embodiment, the transmitting third indication information to the network device includes: transmitting uplink control information to the network device, where the uplink control information includes the third indication information.

In a third aspect, the example of the disclosure provides a communication apparatus. The communication apparatus may be configured to execute steps executed by the network device in the first aspect or any possible design in the first aspect. The network device may implement functions in the methods through a hardware structure, a software module, or a combination of the hardware structure and the software module.

When the communication apparatus shown in the third aspect is implemented through the software module, the communication apparatus may include a transmitting and receiving module and a processing module that are coupled with each other. The transmitting and receiving module may be configured to support communication of the communication apparatus, and the processing module may be configured to execute a processing operation for the communication apparatus, for example, generating information/ messages to be transmitted or obtaining the information/messages by processing received signals.

When the steps of the first aspect are executed, the transmitting and receiving module is configured to transmit first indication information to user equipment, where the first indication information is configured to indicate at least two measurement gap combinations, and each measurement gap combination corresponds to one set of carrier frequencies; and further configured to receive second indication information from the user equipment, where the second indication information is configured to indicate a target measurement gap combination that is being used for location measurement, and the target measurement gap combination belongs to the at least two measurement gap combinations; and a processing module is configured to forbid execution of scheduling within a time period corresponding to the target measurement gap combination, and execute scheduling within a time period corresponding to the other measurement gap combination in the at least two measurement gap combinations.

In a fourth aspect, the example of the disclosure provides a communication apparatus. The communication apparatus may be configured to execute steps executed by the user equipment in the second aspect or any possible design in the second aspect. The user equipment may implement functions in the methods through a hardware structure, a software module, or a combination of the hardware structure and the software module.

When the communication apparatus shown in the fourth aspect is implemented through the software module, the communication apparatus may include a transmitting and receiving module and a processing module that are coupled with each other. The transmitting and receiving module may be configured to support communication of the communication apparatus, and the processing module may be configured to execute a processing operation for the communication apparatus, for example, generating information/messages to be transmitted or obtaining the information/messages by processing received signals.

When the steps of the second aspect are executed, the transmitting and receiving module is configured to receive first indication information from a network device, where the first indication information is configured to indicate at least two measurement gap combinations, and each measurement gap combination corresponds to one set of carrier frequencies; and further configured to transmit second indication information to the network device, where the second indication information is configured to indicate a target measurement gap combination that is being used for location measurement, and the target measurement gap combination belongs to the at least two target measurement gap combinations.

In a fifth aspect, the disclosure provides a communication system. The communication system may include the communication apparatus shown in the third aspect and the communication apparatus shown in the fourth aspect. The communication apparatus shown in the third aspect may be composed of a software module and/or a hardware assembly. The communication apparatus shown in the fourth aspect may be composed of a software module and/or a hardware assembly.

In a sixth aspect, the disclosure provides a communication apparatus including a processor and a memory. The memory is configured to store a computer program, and the processor is configured to execute the computer program, so as to implement the first aspect or any possible design in the first aspect.

In a seventh aspect, the disclosure provides a communication apparatus including a processor and a memory. The memory is configured to store a computer program, and the processor is configured to execute the computer program, so as to implement the second aspect or any possible design in the second aspect.

In an eighth aspect, the disclosure provides a computer-readable storage medium. The computer-readable storage medium stores an instruction (or referred to as a computer program or a program), where when called and executed by a computer, the instruction causes the computer to execute the first aspect or any possible design in the first aspect.

In a ninth aspect, the disclosure provides a computer-readable storage medium. The computer-readable storage medium stores an instruction (or referred to as a computer program or a program), where when called and executed by a computer, the instruction causes the computer to execute the second aspect or any possible design in the second aspect.

Reference may be made to description of beneficial effects of the first aspect and the method in any possible design in the first aspect for beneficial effects of the second aspect to the ninth aspect and possible design in these aspects.

The invention claimed is:

1. A method for transmitting a measurement gap combination, executed by a network device and comprising:
    transmitting first indication information to user equipment, wherein the first indication information is configured to indicate at least two measurement gap combinations, and each of the at least two measurement gap combinations corresponds to one set of carrier frequencies;
    receiving second indication information from the user equipment, wherein the second indication information is configured to indicate a target measurement gap combination that is being used for location measurement, and the target measurement gap combination belongs to the at least two measurement gap combinations; and
    forbidding execution of scheduling within a time period corresponding to the target measurement gap combination, and executing scheduling within a time period corresponding to an other measurement gap combination in the at least two measurement gap combinations.

2. The method according to claim 1, wherein
the first indication information is further configured to indicate a carrier frequency corresponding to each of the at least two measurement gap combinations.

3. The method according to claim 1, further comprising:
receiving positioning reference signal configuration information of a cell to be measured from the user equipment; and
setting the at least two measurement gap combinations according to the positioning reference signal configuration information.

4. The method according to claim 3, wherein the
setting the at least two measurement gap combinations according to the positioning reference signal configuration information comprises:
    determining a corresponding relation among a carrier frequency, a period, and a time offset that are comprised in the positioning reference signal configuration information,
    dividing carrier frequencies satisfying at least one conditions into one of a plurality of carrier frequency groups, such that each of the plurality of carrier frequency groups contain a same condition of the at least one condition, and determining that the same carrier frequency group corresponds to a same measurement gap combination, wherein the at least one condition includes:

periods corresponding to at least two carrier frequencies are the same or in a multiple relation; and time offsets corresponding to at least two carrier frequencies are the same or differ by a set number of time slots.

5. The method according to claim 1, wherein transmitting the first indication information to the user equipment comprises:

transmitting radio resource control signaling to the user equipment, wherein a measurement configuration (MeasConfig) message in the radio resource control signaling comprises the first indication information.

6. The method according to claim 1, further comprising:

receiving third indication information from the user equipment, wherein the third indication information is configured to indicate completion of a measurement that uses the target measurement gap combination.

7. The method according to claim 6, wherein the receiving third indication information from the user equipment comprises:

receiving uplink control information from the user equipment, wherein the uplink control information comprises the third indication information.

8. A non-transitory computer-readable storage medium, storing an instruction, wherein when called and executed by a computer, the instruction causes the computer to execute the method according to claim 1.

9. A method for transmitting a measurement gap combination, executed by user equipment and comprising:

receiving first indication information from a network device, wherein the first indication information is configured to indicate at least two measurement gap combinations, and each of the at least two measurement gap combinations corresponds to one set of carrier frequencies; and transmitting second indication information to the network device, wherein the second indication information is configured to indicate a target measurement gap combination that is being used for location measurement, and the target measurement gap combination belongs to the at least two measurement gap combinations.

10. The method according to claim 9, wherein the receiving the first indication information from the network device comprises:

receiving radio resource control signaling from the network device, wherein a measurement configuration (MeasConfig) message in the radio resource control signaling comprises the first indication information.

11. The method according to claim 9, wherein the first indication information is further configured to indicate a carrier frequency corresponding to each of the at least two measurement gap combinations.

12. The method according to claim 9, further comprising:

transmitting positioning reference signal configuration information of a cell to be measured to the network device, and causing the network device to set the at least two measurement gap combinations according to the positioning reference signal configuration information.

13. The method according to claim 12, further comprising:

receiving auxiliary information from a location server, wherein the auxiliary information is configured to cause the user equipment to obtain a reference cell configuration list, reference cell configuration information, and carrier configuration information for the location measurement.

14. The method according to claim 9, further comprising:

performing the location measurement on carrier frequencies corresponding to the target measurement gap combination by using the target measurement gap combination, and obtaining a measurement result; and transmitting the measurement result to a location server.

15. The method according to claim 9, further comprising:

completing the location measurement that uses the target measurement gap combination, and transmitting third indication information to the network device, wherein the third indication information is configured to indicate completion of measurement that uses the target measurement gap combination.

16. The method according to claim 15, wherein the transmitting third indication information to the network device comprises:

transmitting uplink control information to the network device, wherein the uplink control information comprises the third indication information.

17. A communication apparatus, comprising one or more processors and a memory; wherein the memory is configured to store a computer program; and the one or more processors are collectively configured to execute the computer program, to implement the method according to claim 9.

18. A non-transitory computer-readable storage medium, storing an instruction, wherein when called and executed by a computer, the instruction causes the computer to execute the method according to claim 9.

19. A communication apparatus, comprising one or more processors and a memory; wherein the memory is configured to store a computer program; and the one or more processors are collectively configured to execute the computer program, wherein the one or more processors are collectively configured to:

transmit first indication information to user equipment, wherein the first indication information is configured to indicate at least two measurement gap combinations, and each of the at least two measurement gap combinations correspond to one set of carrier frequencies;

receive second indication information from the user equipment, wherein the second indication information is configured to indicate a target measurement gap combination that is being used for location measurement, and the target measurement gap combination belongs to the at least two measurement gap combinations; and forbid execution of scheduling within a time period corresponding to the target measurement gap combination, and executing scheduling within a time period corresponding to an other measurement gap combination in the at least two measurement gap combinations.

20. The communication apparatus according to claim 19, wherein the one or more processors are further collectively configured to:

receive positioning reference signal configuration information of a cell to be measured from the user equipment; and set the at least two measurement gap combinations according to the positioning reference signal configuration information.

\* \* \* \* \*